(12) United States Patent
Wu et al.

(10) Patent No.: US 11,320,981 B2
(45) Date of Patent: May 3, 2022

(54) FRIENDLY FINITE SCROLLING FOR THEME DATA PAGINATION

(71) Applicant: Citrix Systems, Inc., Fort Lauderdale, FL (US)

(72) Inventors: Hongfei Wu, Nanjing (CN); Yuanyuan Zhang, Nanjing (CN)

(73) Assignee: Citrix Systems, Inc, Fort Lauderdale, FL (US)

( * ) Notice: Subject to any disclaimer, the term of this patent is extended or adjusted under 35 U.S.C. 154(b) by 99 days.

(21) Appl. No.: 15/872,385

(22) Filed: Jan. 16, 2018

(65) Prior Publication Data
US 2019/0220182 A1    Jul. 18, 2019

(51) Int. Cl.
  *G06F 3/0485*  (2013.01)
  *G06F 3/04855*  (2022.01)
  *G06F 16/954*  (2019.01)
  *G06F 16/957*  (2019.01)
  *G06F 40/106*  (2020.01)
  *G06F 40/143*  (2020.01)

(52) U.S. Cl.
  CPC ........ *G06F 3/04855* (2013.01); *G06F 16/954* (2019.01); *G06F 16/9577* (2019.01); *G06F 40/106* (2020.01); *G06F 40/143* (2020.01)

(58) Field of Classification Search
  CPC ............. G06F 3/04855; G06F 16/9577; G06F 16/954; G06F 17/2247; G06F 40/143; G06F 40/106

USPC ................................................. 715/786, 787
  See application file for complete search history.

(56) References Cited

U.S. PATENT DOCUMENTS

| | | | |
|---|---|---|---|
| 8,205,168 B1* | 6/2012 | Van Slembrouck | G06F 3/0483 715/786 |
| 2009/0070707 A1* | 3/2009 | Schaller | G06F 3/04855 715/787 |
| 2011/0083082 A1* | 4/2011 | Gottwald | G06F 16/957 715/744 |
| 2012/0042279 A1* | 2/2012 | Naderi | G06F 3/04855 715/786 |
| 2016/0170629 A1* | 6/2016 | Gabryjelski | G06F 3/04855 715/786 |

* cited by examiner

*Primary Examiner* — Tadesse Hailu
*Assistant Examiner* — Darrin Hope
(74) *Attorney, Agent, or Firm* — Foley & Lardner LLP (57) ABSTRACT

Described embodiments provide systems and methods for controlling loading of web content with scrolling. A scroll manager of a web browser may determine a ratio of a first dimension of a portion of a webpage visible within a viewport of the web browser to a second dimension of an entirety of the webpage. Prior or to loading any other portion of the webpage, the scroll manager may set a scroll thumb dimension within a scroll bar of the web browser based on the ratio. The scroll manager may receive an interaction on the scroll bar of the web browser to arrive at a position within the webpage relative to the second dimension to be displayed within the viewport. Responsive to the interaction, the scroll manager may select a requested portion of the webpage corresponding to the first dimension about the position to render in the viewport.

19 Claims, 6 Drawing Sheets

FRIENDLY FINITE SCROLLING FOR THEME DATA PAGINATION

FIELD OF THE DISCLOSURE

The present application generally relates to loading of web content. In particular, the present application relates to systems and methods for controlling the loading of web content with scrolling.

BACKGROUND

A web-based application (e.g., a web browser) may load and render web content (e.g., a webpage) within a viewport. For long chunks of web content, however, the entirety of the content may not be visible within a single viewport of the web-based application. Conventional approaches of handling such web content may result in excessive consumption of computing processor resources and network bandwidth. Moreover, it may be difficult or perplexing for end users to operate the web-based application to navigate from one portion of the web content to another portion using existing techniques. This may result in low quality of human-computer interaction (HCI) with the web-based application.

BRIEF SUMMARY

The present disclosure is directed towards systems and methods for controlling loading of web content with scrolling. A web-based application (e.g., a web browser) executing on a client may load web content (e.g., a webpage) upon fetching from a server. The webpage may be longer in height or width than dimensions of a viewport of the web-based application. A scrollbar of the web browser may be used to navigate through the webpage thereby render portions of the webpage initially not visible through the viewport. Manipulation of the loading of the web content itself in conjunction with the scroll bar may further aid navigation through the webpage. Such techniques of navigation through web content may include pagination and infinite scrolling.

Under pagination, a single webpage may be divided into multiple webpages of shorter height. Each of these shorter webpages may be labeled with a page number indicating a sequential order of the respective webpage. The page number may be located towards the end of the webpage. Thus, when the scrollbar is used to scroll to the bottom of the webpage, the page number located at the end may assist the end user to make a more informed decision as to the number of webpages left and to the amount of time to view the remaining webpages. Furthermore, the page number may allow the end user to locate which webpage was last viewed and to continue reading from the webpage. To get to the next webpage each time, however, the end user may have to scroll toward the bottom of the current webpage. Once at the bottom of the webpage, the end user may have to hover over a link to the next page, click on the link, and wait for the loading of the next page. In this manner, pagination may interrupt the end user's experience with the web content. The interruption of the experience with the web content may result in the end user turning elsewhere, especially while waiting for the completion in the loading of the next webpage.

In contrast, with infinite scrolling, multiple webpages of various lengths may be stitched or combined together into a single webpage. As the end user scrolls towards the bottom of one page, the next webpage may be rendered below the current webpage. The combination into a single webpage may allow seamless transition between multiple webpages without any interruptions. The wait or delay arising from loading of the next webpage as with pagination may be thus reduced or eliminated, leading to an increase in engagement on the part of the end user with the web content. Furthermore, infinite scrolling may be more suitable to certain types of user interface devices (e.g., touchscreens and mouse), as scrolling may be easier with those devices. Nevertheless, with the addition of more and more web content may lead to excessive consumption of computer processing resources and network bandwidth, thereby resulting in a lag in performance with the web browser loading the webpage. Furthermore, by combining multiple webpages into one, the end user may be uncertain and perplexed as to where the end of the content is located, thus lowering the quality of user experience.

Pagination and infinite scrolling may represent two contrasting attempts at addressing the handling of loading of web content and navigation of webpages larger than the dimensions of the viewport. Pagination may take a single webpage and partition the webpage into multiple smaller webpages. By contrast, infinite scroll may take multiple webpages and combine these webpages into a single longer webpage. As described above, however, both these techniques may suffer from unnecessary consumption of computer processor resources and network bandwidth as well as poor quality of user experience.

To resolve the technical challenges stemming from both pagination and infinite scrolling techniques, the present systems and methods provide controlling of the loading of web content with scrolling. A scroll manager may be installed as a plug-in into the web browser to interface and manipulate various properties of the scrollbar. Upon request, the web browser may initialize loading of the webpage and may at first load and render a portion of the webpage visible through a viewport of the web browser. The scroll manager may estimate an entire height of the webpage and a height of a portion of the webpage visible within the viewport of the web browser. Using the estimates, the scroll manager may calculate a ratio of the entire height of the webpage to the height of the portion. The scroll manager may then set a height of the scroll thumb within the scroll bar of the web browser based on the calculated ratio. By setting the height of the scroll thumb in this manner, the height and position of the scroll thumb within the scroll bar may reflect an actual amount of content available on the web content. An end user thus may view the web content loaded according to the current relative position of the scroll thumb on the scrollbar.

When the end user interacts with the scroll bar (e.g., a click or scroll) to reach another portion of the webpage, the scroll manager may determine the portion of the webpage to be loaded and rendered within the viewport. This functionality of the scroll manager may also allow the end user to mark which portions of the webpage to store for future viewing by performing a particular type of interaction with the scroll bar (e.g., double click). To this end, the scroll manager may identify a position corresponding to the interaction on the scroll bar. The scroll manager may then select a portion of the webpage about the position specified by the end user with the interaction on the scroll bar. Having made the selection, the scroll manager may interface with the web browser to load the specified portion of the webpage about the position of the interaction. The scroll manager may also cause the web browser to render the specified portion within the viewport of the web browser, when the interaction with the scroll bar does not match the particular type. The loading of the specified portion may be done without loading any intervening portions of the webpage between the specified portion and the initial portion. By limiting the loading to the specified portion and not loading any intervening portions, consumption of computing resources and network bandwidth may be decreased in comparison to the pagination and infinite scroll techniques.

At least one aspect of this disclosure is directed to a method of controlling loading of web content with scrolling. A scroll manager a web browser executing on a computing device may determine a ratio of a first dimension of a portion of a webpage visible within a viewport of the web browser to a second dimension of an entirety of the webpage. The scroll manager may set, prior to loading any other portion of the webpage within the viewport of the web browser, a scroll thumb dimension within a scroll bar of the web browser based on at least the ratio of the first dimension to the second dimension. The scroll manager may receive an interaction on the scroll bar of the web browser to arrive at a position within the webpage relative to the second dimension to be displayed within the viewport of the web browser. The scroll manager may select, responsive to the interaction, a requested portion of the webpage corresponding to the first dimension about the position. The scroll manager may replace the portion of the webpage visible within the viewport with the requested portion corresponding to the first dimension about the position.

In some embodiments, the scroll manager may receive a second interaction on the scroll bar of the web browser corresponding to a second position within the webpage relative to the second dimension. In some embodiments, the scroll manager may determine that the second interaction on the scroll bar matches a predefined interaction. In some embodiments, the scroll manager may store, responsive to the determination that the second interaction matches the predefined interaction, a second requested portion of the webpage corresponding to the first dimension about the second position within the webpage relative to the second dimension.

In some embodiments, the scroll manager may receive, subsequent to arriving at a third position within the webpage relative to the first dimension, a third interaction on the scroll bar to arrive at the second position within the webpage relative to the second dimension to be displayed within the viewport of the web browser. In some embodiments, the scroll manager may retrieve, from storage, the second requested portion of the webpage corresponding to the first dimension about the second position, without loading portions outside the second requested portion of the webpage. In some embodiments, the scroll manager may insert, responsive to determining that the second interaction matches the predefined interaction, an indicator at a point of the scroll bar of the browser corresponding to the second requested portion of the webpage.

In some embodiments, the scroll manager may determine, subsequent to loading an initial portion of the webpage within the viewport of the web browser, that the second dimension of the entirety of the webpage exceeds the first dimension of the portion of the webpage visible within the viewport by a predetermined margin. In some embodiments, setting the scroll thumb dimension may include setting the scroll thumb dimension responsive to determining that the second dimension exceeds the first dimension by the predetermined margin.

In some embodiments, setting the scroll thumb dimension may include setting the scroll thumb dimension based on an amount of data corresponding to the entirety of the webpage. In some embodiments, selecting the requested portion of the webpage may include calculating a range corresponding to the first dimension about the position within the webpage based on the ratio of the first dimension to the second dimension. The range may include an initial position and a terminal position of the requested portion of the webpage to be displayed within the viewport of the webpage. In some embodiments, selecting the requested portion of the webpage may include loading data corresponding to the requested portion of the webpage between the initial position and the terminal position of the range calculated based on the first dimension to the second dimension.

In some embodiments, selecting the requested portion of the webpage may include identifying, from the entirety of the webpage, the requested portion of the webpage about the position corresponding to the interaction on the scroll bar of the web browser based on the ratio of the first dimension of the portion of the webpage visible within the viewport of the web browser to the second dimension of the entirety of the webpage. In some embodiments, selecting the requested portion of the webpage may include loading one or more elements of the requested portion of the webpage about the position identified based on the ratio of the first dimension to the second dimension, without loading elements of portions outside the requested portion of the webpage.

In some embodiments, the scroll manager may limit loading of the webpage to the requested portion of the webpage for display within the viewport of the web browser. In some embodiments, replacing the portion of the webpage visible within the viewport may include construct rendering data corresponding to the requested portion of the webpage corresponding to the first dimension about the position.

Another aspect of this disclosure is directed to a system for controlling loading of web content with scrolling. The system may include a scroll manager executable on one or more processors. The scroll manager may determine a ratio of a first dimension of a portion of a webpage visible within a viewport of the web browser to a second dimension of an entirety of the webpage. The scroll manager may set, prior to loading any other portion of the webpage within the viewport of the web browser, a scroll thumb dimension within a scroll bar of the web browser based on at least the ratio of the first dimension to the second dimension. The scroll manager may receive an interaction on the scroll bar of the web browser to arrive at a position within the webpage relative to the second dimension to be displayed within the viewport of the web browser. The scroll manager may select, responsive to the interaction, a requested portion of the webpage corresponding to the first dimension about the position. The scroll manager may replace the portion of the webpage visible within the viewport with the requested portion corresponding to the first dimension about the position.

In some embodiments, the scroll manager may receive a second interaction on the scroll bar of the web browser corresponding to a second position within the webpage relative to the second dimension. In some embodiments, the scroll manager may select, responsive to the interaction, a requested portion of the webpage corresponding to the first dimension about the position. In some embodiments, the scroll manager may replace the portion of the webpage visible within the viewport with the requested portion corresponding to the first dimension about the position.

In some embodiments, the scroll manager may receive a second interaction on the scroll bar of the web browser corresponding to a second position within the webpage relative to the second dimension. In some embodiments, the scroll manager may determine that the second interaction on the scroll bar matches a predefined interaction. In some embodiments, the scroll manager may store, responsive to the determination that the second interaction matches the predefined interaction, a second requested portion of the webpage corresponding to the first dimension about the second position within the webpage relative to the second dimension.

In some embodiments, the scroll manager may receive, subsequent to arriving at a third position within the webpage relative to the first dimension, a third interaction on the scroll bar to arrive at the second position within the webpage relative to the second dimension to be displayed within the viewport of the web browser. In some embodiments, the scroll manager may retrieve, from storage, the second requested portion of the webpage corresponding to the first dimension about the second position, without loading portions outside the second requested portion of the webpage. In some embodiments, the scroll manager may insert, responsive to determining that the second interaction matches the predefined interaction, an indicator at a point of the scroll bar of the browser corresponding to the second requested portion of the webpage.

In some embodiments, the scroll manager may determine, subsequent to loading an initial portion of the webpage within the viewport of the web browser, that the second dimension of the entirety of the webpage exceeds the first dimension of the portion of the webpage visible within the viewport by a predetermined margin. In some embodiments, the scroll manager may set the scroll thumb dimension responsive to determining that the second dimension exceeds the first dimension by the predetermined margin. In some embodiments, the scroll manager may set the scroll thumb dimension based on an amount of data corresponding to the entirety of the webpage.

In some embodiments, the scroll manager may select the requested portion of the webpage by calculating a range corresponding to the first dimension about the position within the webpage based on the ratio of the first dimension to the second dimension. The range may include an initial position and a terminal position of the requested portion of the webpage to be displayed within the viewport of the webpage. In some embodiments, the scroll manager may select the requested portion of the webpage by loading data corresponding to the requested portion of the webpage between the initial position and the terminal position of the range calculated based on the first dimension to the second dimension.

In some embodiments, the scroll manager may select the requested portion of the webpage by identifying, from the entirety of the webpage, the requested portion of the webpage about the position corresponding to the interaction on the scroll bar of the web browser based on the ratio of the first dimension of the portion of the webpage visible within the viewport of the web browser to the second dimension of the entirety of the webpage. In some embodiments, the scroll manager may select the requested portion of the webpage by loading one or more elements of the requested portion of the webpage about the position identified based on the ratio of the first dimension to the second dimension, without loading elements in portions outside the requested portion of the webpage.

In some embodiments, the scroll manager may limit loading of the webpage to the requested portion of the webpage for display within the viewport of the web browser. In some embodiments, the scroll manager may replace the portion of the webpage visible within the viewport by construct rendering data corresponding to the requested portion of the webpage corresponding to the first dimension about the position.

BRIEF DESCRIPTION OF THE FIGURES

The foregoing and other objects, aspects, features, and advantages of the present solution will become more apparent and better understood by referring to the following description taken in conjunction with the accompanying drawings, in which.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for controlling loading of web content with scrolling.

A. Computing Environment

Prior to discussing the specifics of embodiments of the systems and methods of controlling loading of web content with scrolling, it may be helpful to discuss the computing environments in which such embodiments may be deployed.

Figure 1:
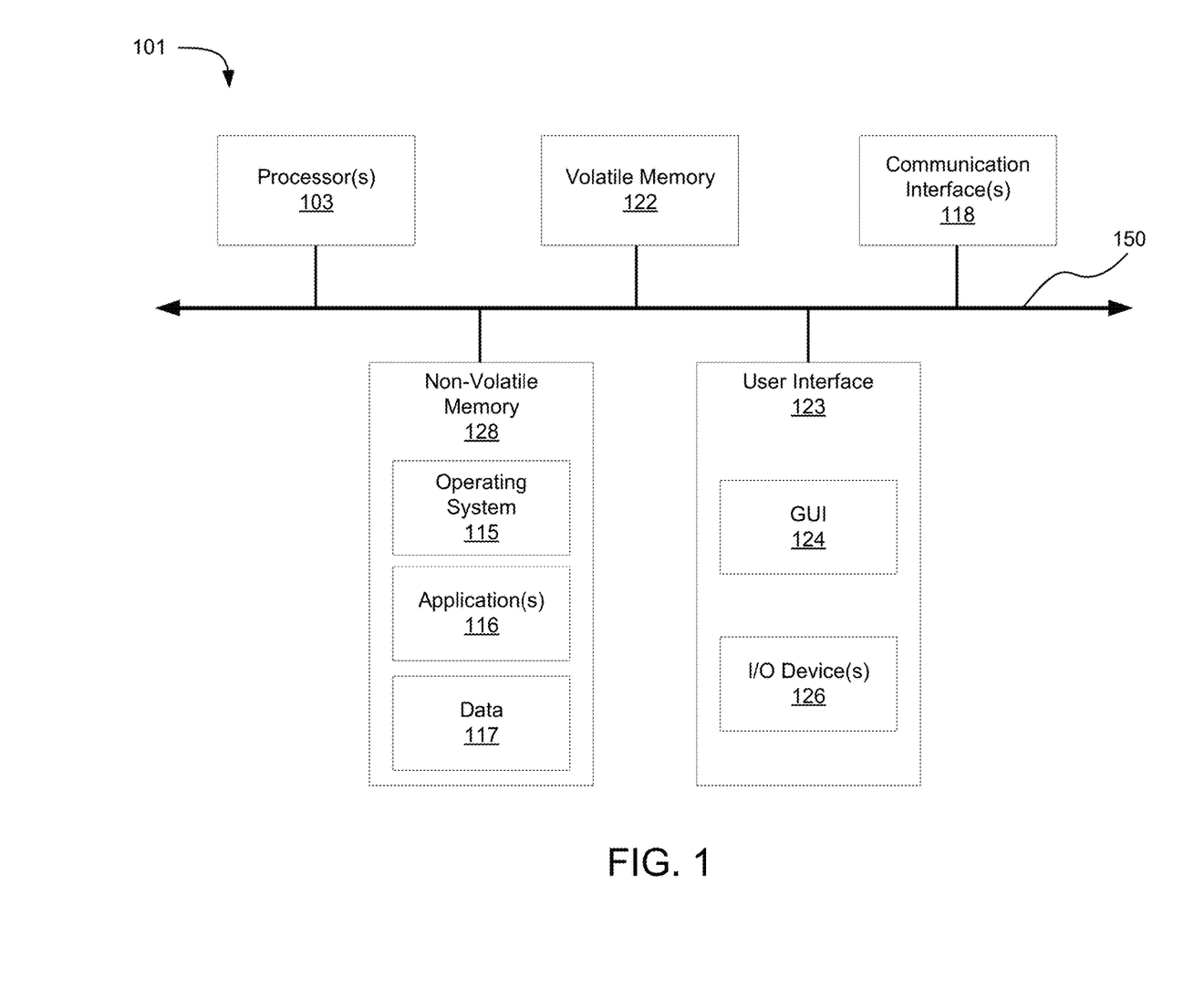
FIG. 1 is a block diagram of embodiments of a computing device.

As shown in FIG. 1, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1 is shown merely as an example, as clients 102, servers 106 and/or appliances may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, the computing device 101 may execute an application on behalf of a user of a client computing device, may execute a virtual machine, which provides an execution session within which applications execute on behalf of a user or a client computing device, such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Controlling the Loading of Web Content with Scrolling The present disclosure is directed towards systems and methods for controlling loading of web content with scrolling. A web-based application (e.g., a web browser) executing on a client may load web content (e.g., a webpage) upon fetching from a server. The webpage may be longer in height or width than dimensions of a viewport of the web-based application. A scrollbar of the web browser may be used to navigate through the webpage thereby render portions of the webpage initially not visible through the viewport. Manipulation of the loading of the web content itself in conjunction with the scroll bar may further aid navigation through the webpage. Such techniques of navigation through web content may include pagination and infinite scrolling.

Under pagination, a single webpage may be divided into multiple webpages of shorter height. Each of these shorter webpages may be labeled with a page number indicating a sequential order of the respective webpage. The page number may be located towards the end of the webpage. Thus, when the scrollbar is used to scroll to the bottom of the webpage, the page number located at the end may assist the end user to make a more informed decision as to the number of webpages left and to the amount of time to view the remaining webpages. Furthermore, the page number may allow the end user to locate which webpage was last viewed and to continue reading from the webpage. To get to the next webpage each time, however, the end user may have to scroll toward the bottom of the current webpage. Once at the bottom of the webpage, the end user may have to hover over a link to the next page, click on the link, and wait for the loading of the next page. In this manner, pagination may interrupt the end user's experience with the web content. The interruption of the experience with the web content may result in the end user turning elsewhere, especially while waiting for the completion in the loading of the next webpage.

In contrast, with infinite scrolling, multiple webpages of various heights may be stitched or combined together into a single webpage. As the end user scrolls towards the bottom of one page, the next webpage may be rendered below the current webpage. The combination into a single webpage may allow seamless transition between multiple webpages without any interruptions. The wait or delay arising from loading of the next webpage as with pagination may be thus reduced or eliminated, leading to an increase in engagement on the part of the end user with the web content. Furthermore, infinite scrolling may be more suitable to certain types of user interface devices (e.g., touchscreens and mouse), as scrolling may be easier with those devices. Nevertheless, with the addition of more and more web content may lead to excessive consumption of computer processing resources and network bandwidth, thereby resulting in a lag in performance with the web browser loading the webpage. Furthermore, by combining multiple webpages into one, the end user may be uncertain and perplexed as to where the end of the content is located, thus lowering the quality of user experience.

Pagination and infinite scrolling may represent two contrasting attempts at addressing the handling of loading of web content and navigation of webpages larger than the dimensions of the viewport. Pagination may take a single webpage and partition the webpage into multiple smaller webpages. By contrast, infinite scroll may take multiple webpages and combine these webpages into a single longer webpage. As described above, however, both these techniques may suffer from unnecessary consumption of computer processor resources and network bandwidth as well as poor quality of user experience.

To resolve the technical challenges stemming from both pagination and infinite scrolling techniques, the present systems and methods provide controlling of the loading of web content with scrolling. A scroll manager may be installed as a plug-in into the web browser to interface and manipulate various properties of the scrollbar. Upon request, the web browser may initialize loading of the webpage and may at first load and render a portion of the webpage visible through a viewport of the web browser. The scroll manager may estimate an entire height of the webpage and a height of a portion of the webpage visible within the viewport of the web browser. Using the estimates, the scroll manager may calculate a ratio of the entire height of the webpage to the height of the portion. The scroll manager may then set a height of the scroll thumb within the scroll bar of the web browser based on the calculated ratio. By setting the height of the scroll thumb in this manner, the height and position of the scroll thumb within the scroll bar may reflect an actual amount of content available on the web content. An end user thus may view the web content loaded according to the current relative position of the scroll thumb on the scrollbar.

When the end user interacts with the scroll bar (e.g., a click or scroll) to reach another portion of the webpage, the scroll manager may determine the portion of the webpage to be loaded and rendered within the viewport. This functionality of the scroll manager may also allow the end user to mark which portions of the webpage to store for future viewing by performing a particular type of interaction with the scroll bar (e.g., double click). To this end, the scroll manager may identify a position corresponding to the interaction on the scroll bar. The scroll manager may then select a portion of the webpage about the position specified by the end user with the interaction on the scroll bar. Having made the selection, the scroll manager may interface with the web browser to load the specified portion of the webpage about the position of the interaction. The scroll manager may also cause the web browser to render the specified portion within the viewport of the web browser, when the interaction with the scroll bar does not match the particular type. The loading of the specified portion may be done without loading any intervening portions of the webpage between the specified portion and the initial portion. By limiting the loading to the specified portion and not loading any intervening portions, consumption of computing resources and network bandwidth may be decreased in comparison to the pagination and infinite scroll techniques.

Figure 2:
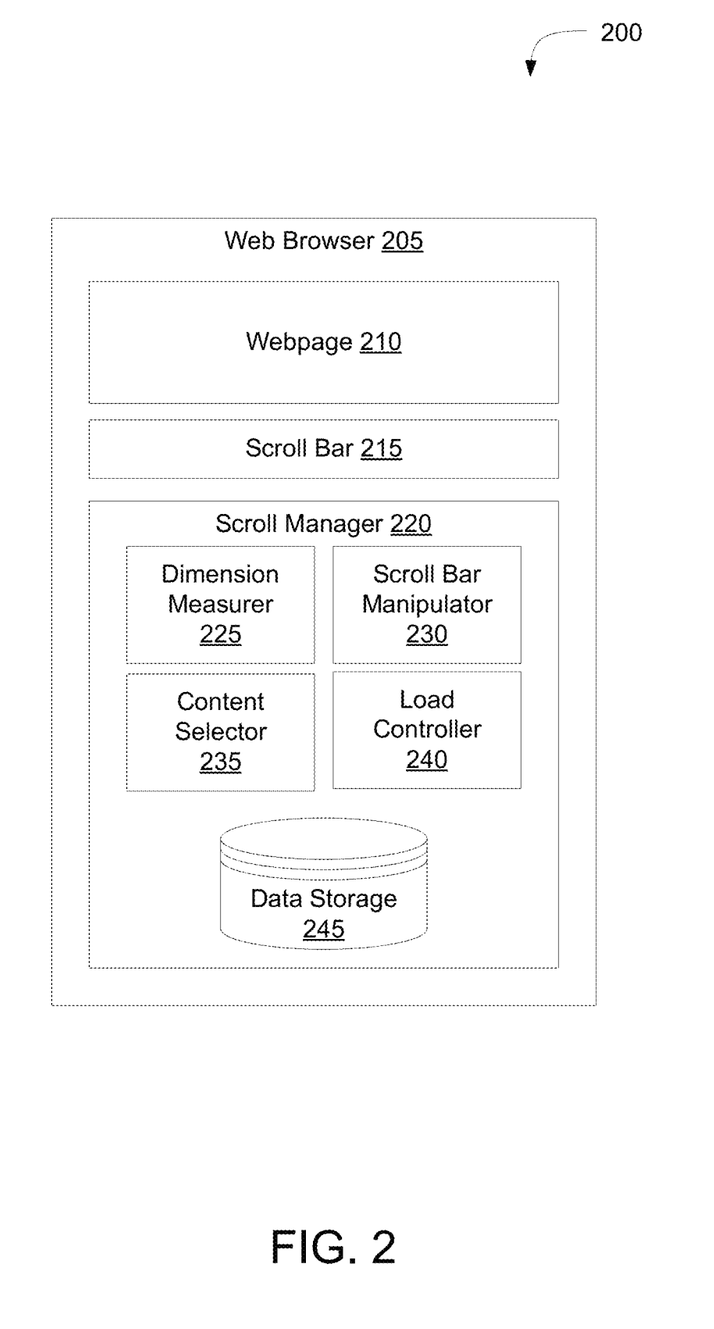
FIG. 2 is a block diagram of an embodiment of a system for controlling loading of web content with scrolling.

Referring now to FIG. 2, depicted is a block diagram of an embodiment of a system 200 for controlling the loading of web content with scrolling. In overview, the system 200 may include a web browser 205 executable on a computing device (e.g., system 100). The web browser 205 may include a webpage 210, a scroll bar 215, and a scroll manager 220. The scroll manager 220 may include a dimension measurer 225, a scroll bar manipulator 230, a content selector 235, a load controller 240, and a data storage 245. The scroll manager 220 may be an add-on, a plug-in, or an extension for the web browser 20, and may interface with the scroll bar 215 to set or change various aspects of the scroll bar 215 in the manner detailed below.

Each of the above-mentioned elements or entities is implemented in hardware, or a combination of hardware and software, in one or more embodiments. Each component of the system 200 may be implemented using hardware or a combination of hardware or software detailed above in connection with FIG. 1. For instance, each of these elements or entities can include any application, program, library, script, task, service, process or any type and form of executable instructions executing on hardware of the system 200, including the webpage 210, the scroll bar 215, and the scroll manager 220. The hardware includes circuitry such as one or more processors in one or more embodiments.

The web browser 205 may receive the webpage 210 from a remote source (e.g., a server hosting the webpage 210), subsequent to sending a request to the remote source for the webpage 210. In some embodiments, the web browser 205 may initially receive a subset portion of the webpage 210 from the remote source and may subsequently send requests to receive additional subset portions of the webpage to the remote source. The webpage 210 may include a computer executable script (e.g., using Hypertext Markup Language (HTML)). The webpage 210 may include one or more Document Object Model (DOM) element specified by the computer executable script. In some embodiments, a subset of the DOM elements forming the webpage 210 may be initially loaded by the web browser 205. For example, the web browser 205 may have initially loaded the main document of the webpage 210, but not have downloaded the video or image elements. The web browser 205 may parse, execute, and render for display the webpage 210 in accordance to the computer executable script. The webpage 210 may be larger in dimension than a viewport of the web browser 205. For example, the portion of the webpage 210 visible through the viewport of the web browser 205 may correspond to a subset of the webpage content.

To navigate from one location of the webpage 210 to another location, the web browser 205 may provide the scroll bar 215 along a vertical and/or horizontal axis of the webpage 210. The scroll bar 215 may be interacted via one or more user input/output devices (e.g., a mouse, a touchpad, a touchscreen, a keyboard, etc.) connected to the computing device executing the web browser 205. Various interactions received via the input/output devices of the computing device may be used to navigate from one portion to another portion (e.g., scrolling on a mouse, touches on a touchpad, keypresses on a keyboard, and gestures on a touchscreen). One or more event listeners and handlers of the web browser 205 may map or translate the interactions received via the input/output devices to interactions on the scroll bar 215. The scroll bar 215 may include a scroll thumb (sometimes referred to as a scroll box), a scroll bar shaft, and arrow buttons. The scroll bar shaft may indicate a scrollable range of the webpage 210 displayed through the viewport of the web browser 205. The position of the scroll thumb in the scroll bar shaft may indicate which portion of the webpage 210 is visible through the viewport of the web browser 205. The arrow buttons may be used to incrementally navigate from one portion of the webpage 210 to another portion. The various properties of the scroll bar 215 may be set by the scroll manager 220 in the manner detailed below.

Upon initial loading of the webpage 210 by the web browser 205, the dimension measurer 225 may identify or determine a dimension of a portion of the webpage 210 visible within a single viewport of the web browser 205. The dimension of the portion may correspond to a height or a width of the webpage 210 visible within the viewport of the web browser 205. The dimension of the portion may be measured in pixels. In some embodiments, the dimension measurer 225 may identify or determine a dimension of the viewport of the web browser 205 (using the HTML property "document.clientHeight" or "document.clientWidth"). The dimension of the viewport of the web browser 205 may correspond to a height or a width and may be less than or equal to a resolution of a display of the computing device executing the web browser 205. The dimension of the viewport may correspond to the dimension of the portion of the webpage 210 visible within the viewport.

The dimension measurer 225 may also identify or determine a dimension of an entirety of the webpage 210 (using the HTML property "document.documentHeight" or "document.documentWidth"). The dimension of the entirety may correspond to a height or a width of the entire webpage 210. The dimension of the portion may be measured in pixels. The dimension of the entirety may correspond to a height or a width of the entire webpage 210 including portions of the webpage 210 not visible within a single viewport of the web browser 205. As such, the dimension of the entirety of the webpage 210 may be greater than or equal to the resolution of the display of the computing device executing the web browser 205 and also the dimension of the viewport of the web browser 205.

In some embodiments, the dimension measurer 225 may estimate, calculate, or otherwise the dimension of the entirety of the webpage 210 visible within the viewport of the web browser 205 based on the computer executable script of the webpage 210 (e.g., HTML markup). The dimension measurer 225 may identify one or more DOM elements forming the webpage 210 based on the computer executable script. For each DOM element, the dimension measurer 225 may identify a dimension of the DOM element. In some embodiments, the dimension measurer 225 may also determine whether two or more DOM elements overlap in dimension. The dimension measurer 225 may calculate or estimate the total dimension of the webpage 210 based on the dimension of each of the constituent DOM elements forming the webpage 210. In some embodiments, the dimension measurer 225 may offset or adjust the total dimension of the webpage 210 based on DOM elements determined as overlapping in the dimension.

Having identified the dimensions, the dimension measurer 225 may estimate, calculate, or otherwise determine a ratio between the dimension of a portion of the webpage 210 visible within a viewport of the web browser 205 to the dimension of an entirety of the webpage. The ratio may indicate or reflect a proportion or a percentage of the webpage 210 visible through the viewport of the web browser 205 to the entirety of the webpage. For example, if the viewport is 984 pixels in length and the entirety of the webpage is 4920 in length, 20% of the webpage may be initially visible through the viewport of the web browser 205.

Based on the ratio between the dimension of the portion versus the entirety of the webpage 210, the scroll bar manipulator 230 may set a scroll thumb dimension with the scroll bar 215. The ratio of the scroll thumb dimension to a dimension of the entirety of the scroll bar trunk may correspond to or may be equal to the ratio between the dimension of the visible portion of the webpage 210 versus the dimension of the entirety of the webpage 210. In some embodiments, the scroll bar manipulator 230 may set the scroll thumb dimension further based on the dimension of the portion of the webpage 210. In some embodiments, the scroll bar manipulator 230 may interface with the scroll bar 215 to set or change the scroll thumb dimension based on the determined ratio. In some embodiments, the scroll bar manipulator 230 may override the default scroll thumb dimension set by the web browser 205. By setting the scroll thumb dimension in this manner, the scroll bar may be reflective of the portion of the webpage 210 visible within the viewport of the web browser 205.

In some embodiments, the scroll bar manipulator 230 may determine whether the dimension of the entirety of the webpage 210 is greater than the dimension of the portion of the webpage 210 visible through the viewport by a predetermined margin. The predetermined margin may be set in pixels. If the dimension of the entirety of the webpage 210 is determined to be greater than the dimension of the visible portion by the predetermined margin, the scroll bar manipulator 230 may set the scroll thumb dimension based on the calculated ratio. Otherwise, if the dimension of the entirety of the webpage 210 is determined to be less than or equal to the dimension of the visible portion by the predetermined margin, the scroll bar manipulator 230 may maintain the default scroll thumb dimension set by the web browser 205.

With the scroll thumb dimension set based on the ratio between the dimension of the visible portion and the dimension of the entirety of the webpage 210, the load controller 240 may limit additional loading of the webpage 210 by the web browser 205 based on the dimension of the visible portion. The web browser 205 may have already parsed the webpage 210 to identify one or more DOM container elements, but not the additional content (e.g., images, videos, text) to insert into the containers to build the entirety of the webpage 210. In some embodiments, the load controller 240 may restrict or prevent the web browser 205 from loading portions of the webpage 210 beyond the portion of the webpage 210 initially visible through the viewport. In some embodiments, the load controller 240 may restrict or prevent the web browser 205 from constructing rendering data corresponding beyond the portion of the webpage 210 initially visible through the web browser 205. By limiting the loading of the webpage 210 in this manner, the load controller 240 may reduce consumption of computing resources at the computing device executing the web browser 205.

Figure 3A:
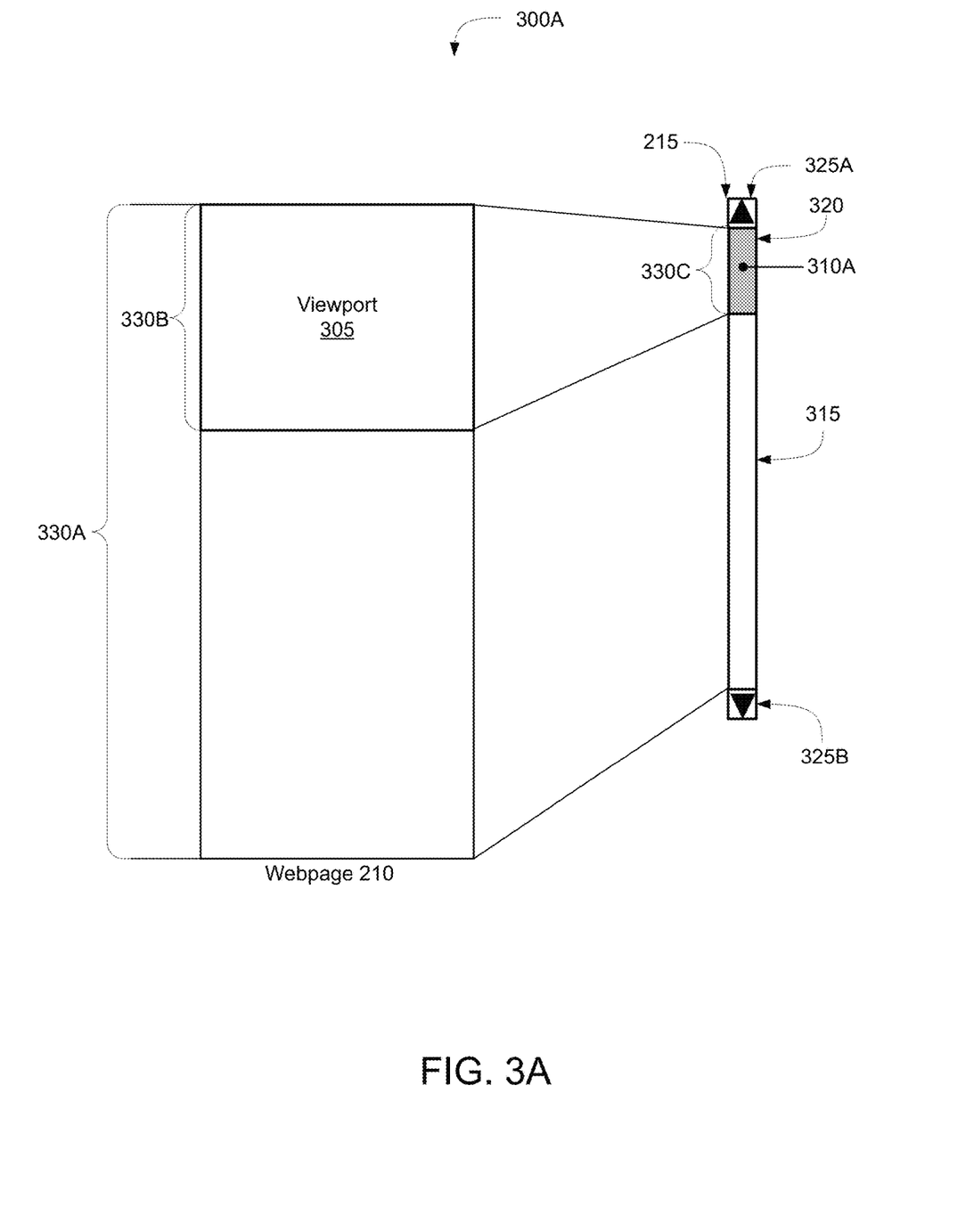
FIGS. 3A-3C are interaction diagrams of at various stages of an embodiment for a system for controlling loading of web content with scrolling.

Referring now to FIG. 3A, illustrated is an interaction diagram at stage 300A of an embodiment of the system of controlling the loading of web content with scrolling. Stage 300A may correspond to an initial loading of the webpage 210 by the web browser 205. The entirety of the webpage 210 may have a dimension 330A. The portion of the webpage 210 visible through the viewport 305 of the web browser 205 may have a dimension 330B. The dimension 330A may be longer than dimension 330B. A scroll bar 215 may be used to navigate through the webpage 210 in conjunction with an input/output device of the computing device executing the web browser 205. The scroll bar 215 may have a scroll bar shaft 315 with a scroll thumb 320 centered about position 310A. The scroll bar 215 may also have two arrow buttons 325A and 325B, one for scrolling upwards and another for scrolling downwards.

The dimension measurer 225 may identify the dimension 330A for the entirety of the webpage 210 and the dimension 330B for the portion of the webpage 210 visible through the viewport 305 using the techniques detailed above. Using these two measures, the dimension measurer 225 may calculate a ratio between the dimension 330A and the dimension 330B. Based on the ratio between 330A and 330B, the scroll bar manipulator 230 may set a dimension 330C of the scroll thumb 320. With the dimension 330C of the scroll thumb 320 set, the ratio between the dimension 330C of the scroll thumb 320 versus a dimension of the entirety of the scroll bar shaft 315 may correspond or may be equal to the ratio between the dimension 330B to dimension 330A. As such, the dimension 330C of the scroll bar thumb 320 in relation to the entirety of the scroll bar shaft 315 may be reflective of the proportion of the webpage 210 displayed through the viewport 305.

Referring again to FIG. 2, subsequent to initial loading of the webpage 210, the content selector 235 may receive an interaction with, on, or otherwise associated with the scroll bar 215. In some embodiments, the content selector 235 may monitor or detect the interaction associated with the scroll bar 215 using an event listener and/or event handler (using JavaScript™ functions TouchEvent, OnMouseWheel, etc.). The event listener and/or event handler may be for one or more interactions with an input/output device connected to the computing device executing the web browser 205. In some embodiments, the content selector 235 may identify a previous position of the scroll thumb relative to the scroll trunk of the scroll bar 215, prior to receipt of the interaction. The content selector 235 may identify a scroll distance based on the received or detected interaction. In some embodiments, the content selector 235 may identify the scroll distance using the event listener and/or event handler corresponding to the detected interaction. Based on the previous position and the scroll distance, the content selector 235 may calculate, predict, or otherwise determine the specified position within the webpage specified by the interaction.

Using the specified position, the content selector 235 may select a portion from the entirety of the webpage 210 specified by the interaction corresponding to the dimension of the portion of the webpage 210 visible through the viewport about the specified position. The content selector 235 may identify the dimension of the specified portion about the specified position indicated by the interaction on the scroll bar 215. The content selector 235 may associate, correspond, or otherwise set the specified position as the center of the requested portion. Based on the specified position and the dimension of the viewport, the content selector 235 may calculate an initial position corresponding to an initial end of the specified portion of the webpage 210 to be displayed (e.g., top of the portion). In addition, the content selector 235 may calculate a terminal position corresponding to a terminal end of the specified portion of the webpage 210 to be displayed (e.g., bottom of the portion). Using the initial position and the terminal position, the content selector 235 may calculate a range corresponding to the dimension of the viewport about the specified position.

The load controller 240 may load the specified portion of the webpage 210, without loading portions outside the specified portion of the webpage 210. In some embodiments, the load controller 240 may identify one or more DOM elements (or other data) of the webpage 210 within the specified portion based on the computer executable script for the entirety of the webpage 210. In some embodiments, the load controller 240 may identify the one or more DOM elements between the initial position and the terminal position of the webpage 210. For each DOM element of the webpage 210, the load controller 240 may identify an initial position corresponding to an initial end of the DOM element within the webpage 210. The load controller 240 may also identify a terminal position corresponding to a terminal end of the DOM element within the webpage 210. The load controller 240 may determine whether the DOM element is at least partially within the specified portion of the webpage 210 based on the initial position and the terminal position of the DOM element and the initial position and the terminal position of the specified portion.

If the DOM element is determined to be at least partially within the specified portion, the load controller 240 may load the DOM element. In some embodiments, for each DOM element of the specified portion, the load controller 240 may send a request to a remote source for the content of the DOM element. For example, if the DOM element includes an image file identified by a Uniform Resource Locator (URL) address, the load controller 240 may send a request for the image file to the remote source indicated by the URL address. Subsequently, the load controller 240 may receive the content for the DOM element. Upon receipt of the content, the load controller 240 may insert the content into the corresponding DOM element. In some embodiments, the load controller 240 may store the content for the corresponding DOM elements included in the specified portion of the webpage 210 onto the data storage 245.

On the other hand, if the DOM element is determined to be entirely outside the specified portion, the load controller 240 may prevent the loading of the DOM element. In some embodiments, the load controller 240 may restrict or prevent the web browser 205 from loading portions of the webpage 210 beyond the specified portion of the webpage 210. In some embodiments, the load controller 240 may restrict or prevent the web browser 205 from constructing rendering data corresponding beyond the portion of the webpage 210 specified by the interaction on the scroll bar 215. As such, the load controller 230 may limit loading of the webpage 210 to the specified portion, when the interaction with the scroll bar is received. By discretely loading in this manner, consumption of computing processing resources and network bandwidth may be reduced.

The load controller 240 may determine whether the received interaction associated with the scroll bar matches a predefined interaction (e.g., a double click or repeated gesture on a position on the scroll bar). The predefined interaction may indicate whether the specified portion is to be rendered onto the viewport of the web browser 205 or is to be stored on the data storage 245. The determination of whether the received interaction matches the predefined interaction may be prior, concurrent, or subsequent to selecting and loading of the specified portion of the webpage 210.

If the received interaction is determined to not match the predefined interaction, the load controller 240 may replace the portion of the webpage 210 previously visible through the viewport of the web browser 205 with the specified portion. In some embodiments, the load controller 240 may construct rendering data corresponding to the specified portion of the webpage 210 for display within the viewport of the web browser 205. In some embodiments, the load controller 240 may access the data storage 245 to retrieve the specified portion of the webpage 210, including the one or more constituent DOM elements.

Figure 3B:
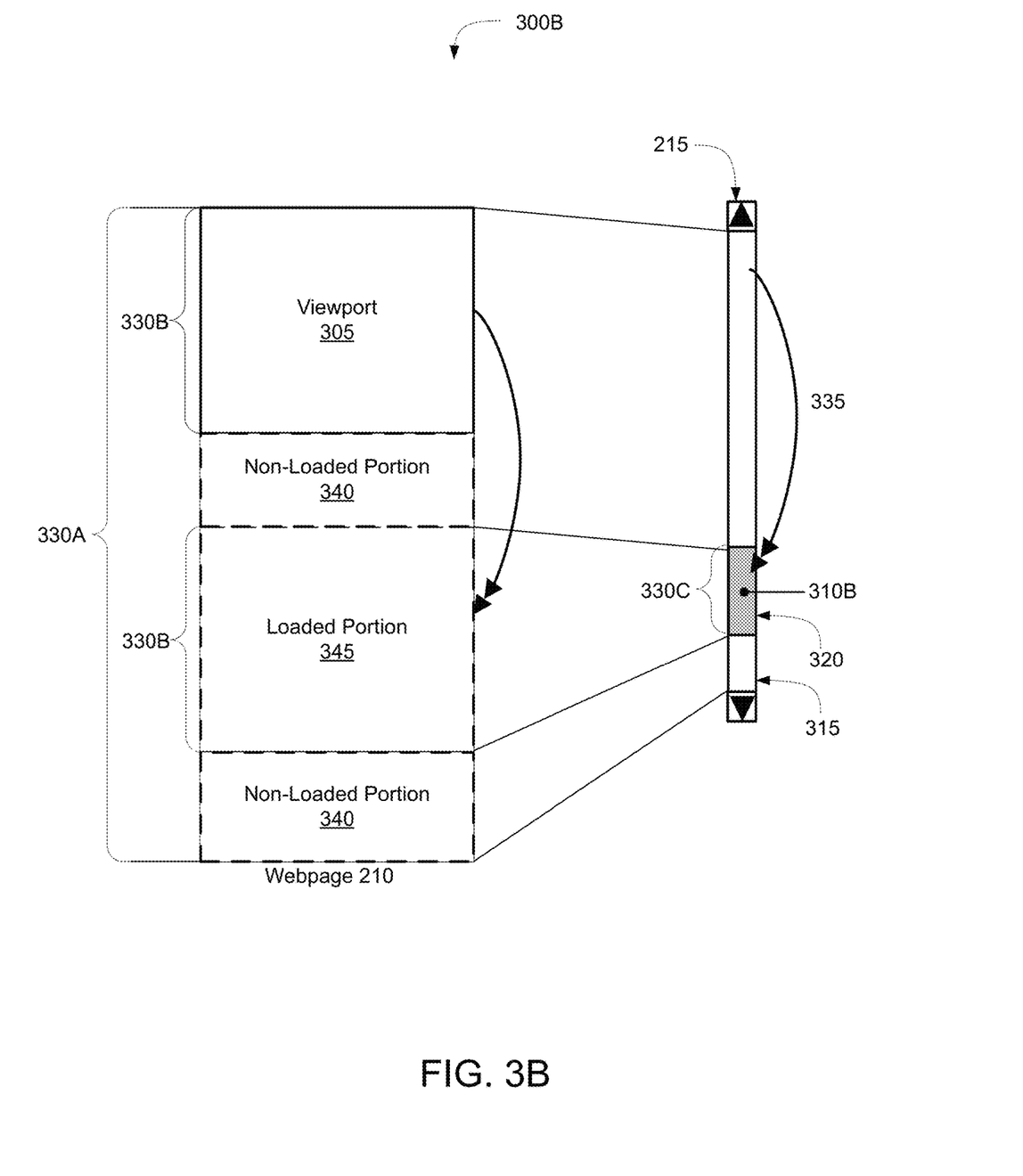

Referring now to FIG. 3B, illustrated is an interaction diagram at stage 300B of an embodiment of the system of controlling the loading of web content with scrolling. At stage 300B, the content selector 235 may have received an interaction 335 associated with the scroll bar 215 to arrive at position 310B from position 310A. For example, the content selector 235 may have detected the interaction 335A at position 310B of the scroll bar shaft 315. The content selector 235 may select the specified portion 345 of the webpage 210 about the specified position 310B based on the dimension 330B. To that end, the content selector 235 may identify an initial position and a terminal position for the specified portion 345 about the position 310B based on the dimension 330B. Once identified, the load controller 240 may load the specified portion 345 including the constituent DOM elements, without loading the non-specified portions 340. The load controller 240 may then construct the rendering data for the specified portion 345, and cause the web browser 205 to display the specified portion 345.

Referring again to FIG. 2, conversely if the received interaction is determined to match the predefined interaction, the load controller 240 may store the specified portion of the webpage 210 including the one or more DOM elements onto the data storage 245 for future retrieval and display. In some embodiments, the load controller 240 may store the specified portion of the webpage 210 for a predefined duration of time. In some embodiments, the load controller 240 may store the specified portion of the webpage 210 for a duration of the web session of the web browser 205. In some embodiments, the load controller 240 may store the specified portion of the webpage 210 until the web browser 205 requests another webpage separate from the webpage 210.

In some embodiments, the load controller 240 may identify a point corresponding to the interaction matching the predefined interaction on, with, or otherwise associated with the scroll bar 215. The point may be measured in pixels relative to a dimension of the scroll trunk for the scroll bar 215. The point may correspond to the specified position corresponding to the interaction with the scroll bar 215. Once the point is identified, the load controller 240 may insert an indicator at the point on the scroll bar 215 within the scroll trunk. The indicator may correspond to the specified portion of the webpage 210 stored onto the data storage 245.

After the storage of the specified portion of the webpage 210, the content selector 235 may receive another subsequent interaction with, on, or otherwise associated with the scroll bar 215. The content selector 235 may in turn again select a new portion from the entirety of the webpage 210 corresponding to the dimension of the portion of the webpage 210 visible through the viewport about the specified position of the subsequent interaction. The web browser 205 may have navigated to another portion of the webpage 210 since the storage of the specified portion of the webpage 210. Furthermore, there may be multiple specified portions of the webpage 210 stored onto the data storage 245. The content selector 235 may determine whether the subsequent interaction with the scroll bar 215 is to arrive at a position corresponding to the position corresponding to one of the specified portions of the webpage 210. For each specified portion on storage, the content selector 235 may determine whether the position indicated by the subsequent interaction is within the initial position and the terminal position of the specified portion of the webpage 210.

If the position is not within the initial position and the terminal position of any of the specified portion of the webpage 210 on storage, the functionalities of the content selector 235 and the load controller 240 may be repeated as detailed above. For example, the content selector 235 again may identify a new portion of the webpage 210 specified by the subsequent interaction. In addition, the load controller 240 may store the new portion of the webpage 210 onto the data storage 235. The load controller 240 may also determine whether the subsequent interaction matches the predefined interaction, and may perform as describe above accordingly.

On the other hand, if the position is within the initial position and the terminal position of one of the specified portions of the webpage 210 on storage, the load controller 240 may access the data storage 245 to retrieve the specified portion of the webpage 210. The load controller 240 may determine an overlap between the specified portion of the webpage 210 stored on the data storage 245 and the new portion indicated by the subsequent interaction. Based on the overlap, the load controller 240 may load a remaining subset of the new portion corresponding to the subsequent interaction, without loading any other portions of the webpage 210. If the overlap is determined to be full, the load controller 240 may load the specified portion of the webpage 210 previously stored on the data storage 245 If the overlap is determined to be partial, the load controller 240 may load one or more DOM elements of the remaining subset of the new portion. In some embodiments, the load controller 240 may send a request to a remote source for the content of the DOM element. Subsequently, the load controller 240 may receive the content for the DOM element and may insert the content into the DOM element of the remaining subset. Once all the DOM elements are received, the load controller 240 may add to the portion of the webpage 210 previously stored on the data storage 245 for display within the viewport.

In some embodiments, the load controller 240 may determine whether the subsequent interaction is on the point corresponding to the specified portion previously stored onto the data storage 245. In some embodiments, the load controller 240 may determine whether the subsequent interaction is on the indicator inserted over the point corresponding to the specified portion. If the subsequent interaction is on the point, the load controller 240 may access the data storage 245 to retrieve the specified portion of the webpage 210. The load controller 240 may then display the specified portion of the webpage 210 previously stored onto the data storage 245 onto the viewport of the web browser 205. Otherwise, if the subsequent interaction is not on the point, functionalities of the content selector 235 and the load controller 240 may be repeated in the manner detailed above.

Figure 3C:
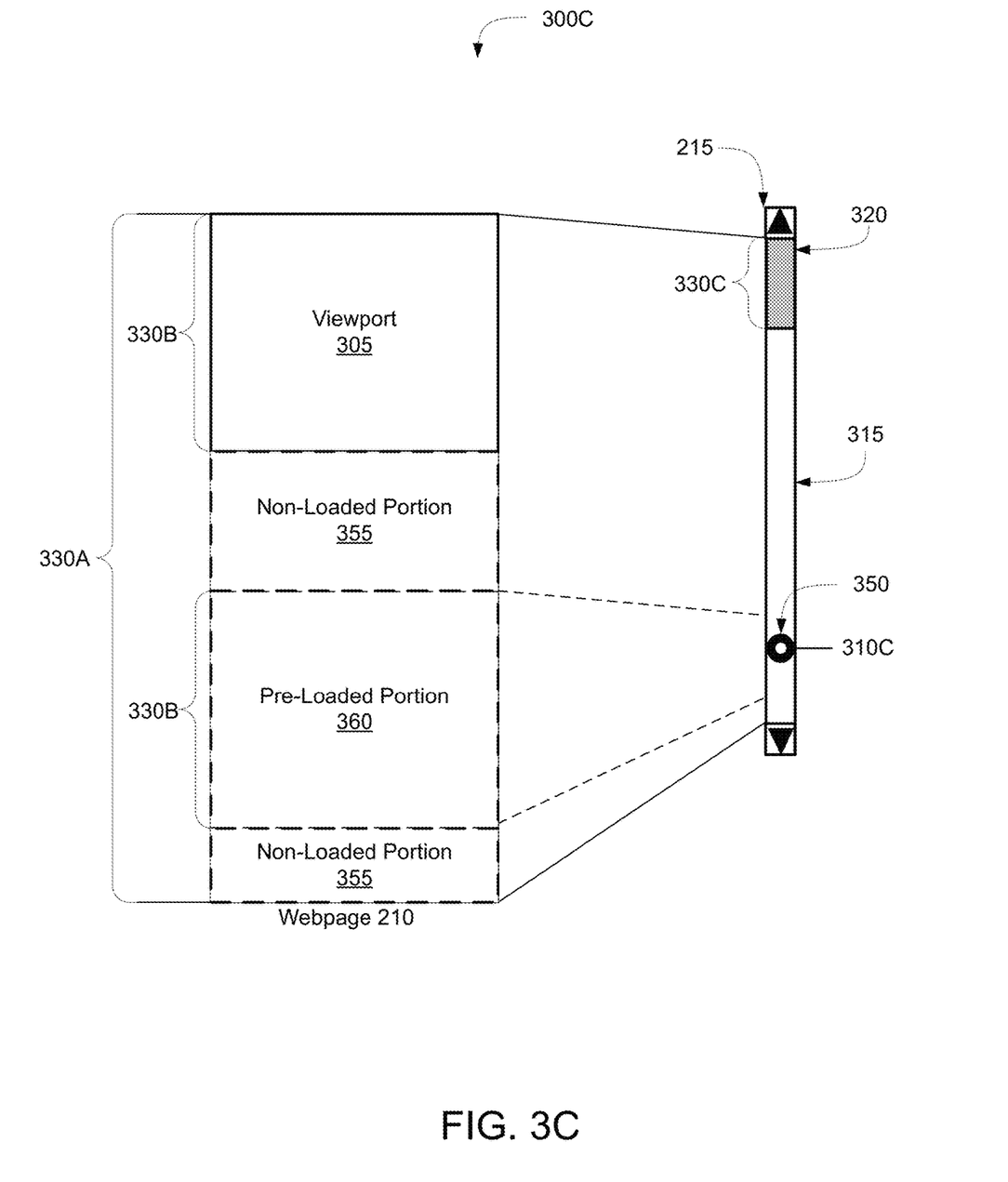

Referring now to FIG. 3C, illustrated is an interaction diagram at stage 300C of an embodiment of the system of controlling the loading of web content with scrolling. At stage 300C, the content selector 235 may have received an interaction with the scroll bar 215 to arrive at position 310C. The content selector 235 may identify an initial position and a terminal position for a specified portion 360 about the position 310C based on the dimension 330B. Once identified, the load controller 240 may load the specified portion 360 including the constituent DOM elements, without loading the non-specified portions 355. The load controller 240 may also determine that the interaction on the scroll bar 215 matches the predefined interaction. The load controller 240 may store the specified portion 360 onto the data storage 245, without loading the non-specified portions 355. Furthermore, the load controller 240 may insert an indicator 350 onto the scroll bar shaft 315. Upon subsequent interaction with the scroll bar to arrive at position 310C, the load controller 240 may access the data storage 245 to retrieve the specified portion 360 and may display the specified portion 360.

In comparison to the pagination and the infinite scroll techniques, the scroll manager 220 may save computing processing resources and network bandwidth and may also improve human-computer interactions (HCI) with the web browser 205 and the webpage 210. With the functionalities of the dimension measurer 225 and the scroll bar manipulator 230, the scroll thumb of the scroll bar 215 may be set to reflect a proportion of data of the webpage 210 is visible through the viewport of the web browser 205. Setting the scroll bar as such may improve the quality of improvement with the web browser 205 and the webpage 210. Furthermore, with the functionalities content selector 235 and the load controller 245, the loading of the webpage 210 may be limited or restricted to those portions requested by interactions. This may reduce consumption of computer processing resources and network bandwidth.

Figure 4:
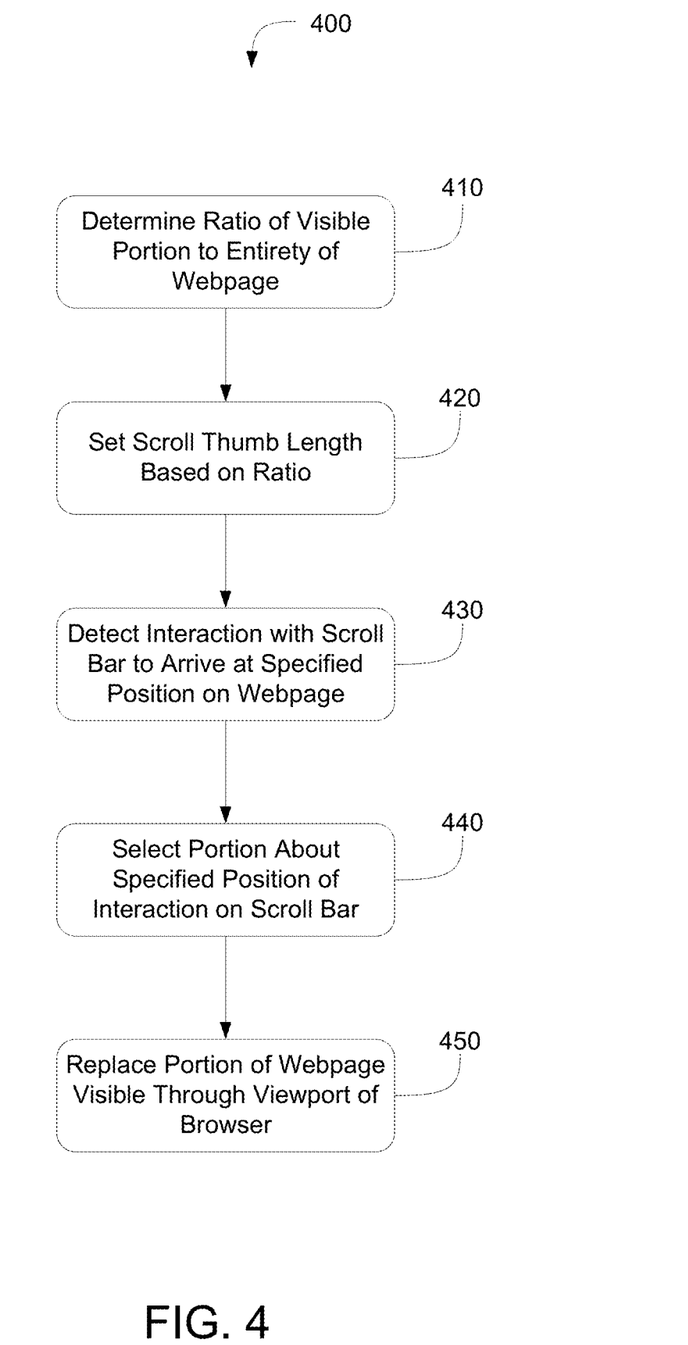
FIG. 4 is a flow diagram of an embodiment of a method for controlling loading of web content with scrolling.

Referring now to FIG. 4, depicted is a flow diagram of an embodiment of a method 400 of controlling the loading of web content with scrolling. The operations and functionalities of the method 400 may be performed by the components described in FIG. 1 and FIG. 2, the system 100, and/or the system 200 detailed above. In brief overview, the scroll manager may determine a ratio of a visible portion of the webpage to an entirety of the webpage (410). The scroll manager may set a scroll thumb dimension based on the determined ratio (420). The scroll manager may detect an interaction with the scroll bar to arrive at a specified position of the webpage (430). The scroll manager may select a portion of the webpage about the specified position of the interaction with the scroll bar (440). The scroll manager may replace the portion of the webpage visible through a viewport of the web browser (450).

The scroll manager may determine a ratio of a visible portion of the webpage to an entirety of the webpage (410). The scroll manager may identify a dimension of the portion of the webpage initially visible through a viewport of the web browser. The scroll manager may also identify a dimension of the entirety of the webpage. The identification of the dimension of the entire webpage may be based on one or more DOM elements forming the webpage. With the identification of the dimension of the portion of the webpage and the dimension of the entire webpage, the scroll manager may calculate the ratio.

The scroll manager may set a scroll thumb dimension based on the determined ratio (420). Using the ratio between the dimension of the portion of the webpage initially visible through the viewport and the dimension of the entire webpage, the scroll manager may set the scroll thumb dimension. In this manner, the scroll thumb dimension may be indicative of the proportion of the webpage visible through the viewport of the web browser. The scroll manager may detect an interaction with the scroll bar to arrive at a specified position of the webpage (430). Subsequent to initial loading of the webpage, the scroll manager may receive the interaction with the scroll bar.

The scroll manager may select a portion of the webpage about the specified position of the interaction with the scroll bar (440). The scroll manager may identify an initial position and a terminal position of the specified portion of the webpage about the position corresponding to the interaction based on the dimension of the viewport. With the initial position and the terminal position of the portion of the webpage identified, the scroll manager may load one or more DOM elements at least partially included in the portion of the webpage. The scroll manager may also restrict loading of other portions of the webpage, besides the portion specified by the interaction.

The scroll manager may replace the portion of the webpage visible through a viewport of the web browser (450). Upon selecting the portion of the webpage specified by the interaction, the scroll manager may construct rendering data for the portion of the webpage. The scroll manager may then display the portion of the webpage using the rendering data.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of controlling loading of web content with scrolling, comprising:

identifying, by a scroll manager of a web browser executing on a computing device, a first dimension of a first portion of a webpage visible within a viewport of the web browser;

determining, by the scroll manager, a second dimension of an entirety of the webpage based at least on a dimension of each of a plurality of elements of the webpage and an overlap between at least two of the plurality of elements, prior to loading one or more of the plurality of elements in any other portion besides the first portion of the webpage stored onto a storage of the computing device;

setting, by the scroll manager, prior to displaying any other portion besides the first portion of the webpage within the viewport of the web browser, a scroll thumb dimension within a scroll bar of the web browser based at least on a ratio of the first dimension to the second dimension;

receiving, by the scroll manager, an interaction on the scroll bar of the web browser to arrive at a position within the webpage relative to the second dimension to be displayed within the viewport of the web browser;

selecting, by the scroll manager responsive to the interaction, a second portion of the webpage corresponding to the first dimension about the position to load onto the storage;

identifying, by the scroll manager from the plurality of elements identified by the webpage, one or more elements to be included in the second portion of the webpage about the position; and replacing, by the scroll manager, the first portion of the webpage visible within the viewport with the second portion corresponding to the first dimension about the position by displaying the one or more elements included in the second portion loaded on the storage, without loading an intervening portion of the webpage between the first portion and the second portion onto the storage.

2. The method of claim 1, further comprising:

receiving, by the scroll manager, a second interaction on the scroll bar of the web browser corresponding to a second position within the webpage relative to the second dimension;

determining, by the scroll manager, that the second interaction on the scroll bar matches a predefined interaction; and storing, by the scroll manager, responsive to the determination that the second interaction matches the predefined interaction, a second requested portion of the webpage corresponding to the first dimension about the second position within the webpage relative to the second dimension.

3. The method of claim 2, further comprising:
receiving, by the scroll manager, subsequent to arriving at a third position within the webpage relative to the first dimension, a third interaction on the scroll bar to arrive at the second position within the webpage relative to the second dimension to be displayed within the viewport of the web browser; and
retrieving, by the scroll manager, from storage, the second requested portion of the webpage corresponding to the first dimension about the second position, without loading portions outside the second requested portion of the webpage.

4. The method of claim 2, further comprising
inserting, by the scroll manager, responsive to determining that the second interaction matches the predefined interaction, an indicator at a point of the scroll bar of the browser corresponding to the second requested portion of the webpage.

5. The method of claim 1, further comprising:
determining, by the scroll manager, subsequent to loading an initial portion of the webpage within the viewport of the web browser, that the second dimension of the entirety of the webpage exceeds the first dimension of the first portion of the webpage visible within the viewport by a predetermined margin; and
wherein setting the scroll thumb dimension further comprises setting the scroll thumb dimension responsive to determining that the second dimension exceeds the first dimension by the predetermined margin.

6. The method of claim 1, wherein setting the scroll thumb dimension further comprises setting the scroll thumb dimension based on an amount of data corresponding to the entirety of the webpage.

7. The method of claim 1, wherein selecting the second portion of the webpage further comprises:
calculating a range corresponding to the first dimension about the position within the webpage based on the ratio of the first dimension to the second dimension, the range including an initial position and a terminal position of the second portion of the webpage to be displayed within the viewport of the webpage; and
loading data corresponding to the second portion of the webpage between the initial position and the terminal position of the range calculated based on the first dimension to the second dimension.

8. The method of claim 1, further comprising limiting, by the scroll manager, loading of the webpage to the second portion of the webpage for display within the viewport of the web browser.

9. The method of claim 1, wherein replacing the first portion of the webpage visible within the viewport further comprises construct rendering data corresponding to the second portion of the webpage corresponding to the first dimension about the position.

10. The method of claim 1, further comprising determining, by the scroll manager, a third dimension corresponding to the overlap of at least two elements of the plurality of elements, prior to loading the at least two elements in another portion of the webpage besides the first portion onto the storage; and
wherein determining the second dimension further comprises offsetting the second dimension by the third dimension corresponding to the overlap.

11. A system for controlling loading of web content with scrolling, comprising:
a scroll manager of a web browser executable on one or more processors, configured to:
identify a first dimension of a first portion of a webpage visible within a viewport of the web browser;
determine a second dimension of an entirety of the webpage based at least on a dimension of each of a plurality of elements of the webpage and an overlap between at least two of the plurality of elements, prior to loading one or more of the plurality of elements in any other portion besides the first portion of the webpage stored onto a storage of the computing device;
set, prior to displaying any other portion besides the first portion of the webpage within the viewport of the web browser, a scroll thumb dimension within a scroll bar of the web browser based at least on a ratio of the first dimension to the second dimension;
receive an interaction on the scroll bar of the web browser to arrive at a position within the webpage relative to the second dimension to be displayed within the viewport of the web browser;
select, responsive to the interaction, a second portion of the webpage corresponding to the first dimension about the position to load onto the storage;
identify, from the plurality of elements identified by the webpage, one or more elements to be included in the second portion of the webpage about the position; and
replace the first portion of the webpage visible within the viewport with the second portion corresponding to the first dimension about the position by displaying the one or more elements included in the second portion onto the storage, without loading an intervening portion of the webpage between the first portion and the second portion onto the storage.

12. The system of claim 11, wherein the scroll manager is further configured to:
receive a second interaction on the scroll bar of the web browser corresponding to a second position within the webpage relative to the second dimension;
determine that the second interaction on the scroll bar matches a predefined interaction; and
store, responsive to the determination that the second interaction matches the predefined interaction, a second requested portion of the webpage corresponding to the first dimension about the second position within the webpage relative to the second dimension.

13. The system of claim 12, wherein the scroll manager is further configured to:
receive, subsequent to arriving at a third position within the webpage relative to the first dimension, a third interaction on the scroll bar to arrive at the second position within the webpage relative to the second dimension to be displayed within the viewport of the web browser; and
retrieve, from storage, the second requested portion of the webpage corresponding to the first dimension about the second position, without loading portions outside the second requested portion of the webpage.

14. The system of claim 12, wherein the scroll manager is further configured to insert, responsive to determining that the second interaction matches the predefined interaction, an indicator at a point of the scroll bar of the browser corresponding to the second requested portion of the webpage.

15. The system of claim 11, wherein the scroll manager is further configured to:
- determine, subsequent to loading an initial portion of the webpage within the viewport of the web browser, that the second dimension of the entirety of the webpage exceeds the first dimension of the first portion of the webpage visible within the viewport by a predetermined margin; and
- set the scroll thumb dimension responsive to determining that the second dimension exceeds the first dimension by the predetermined margin.

16. The system of claim 11, wherein the scroll manager is further configured to set the scroll thumb dimension based on an amount of data corresponding to the entirety of the webpage.

17. The system of claim 11, wherein the scroll manager is further configured to select the second portion of the webpage by:
- calculating a range corresponding to the first dimension about the position within the webpage based on the ratio of the first dimension to the second dimension, the range including an initial position and a terminal position of the second portion of the webpage to be displayed within the viewport of the webpage; and
- loading data corresponding to the second portion of the webpage between the initial position and the terminal position of the range calculated based on the first dimension to the second dimension.

18. The system of claim 11, wherein the scroll manager is further configured to limit loading of the webpage to the second portion of the webpage for display within the viewport of the web browser.

19. The system of claim 11, wherein the scroll manager is further configured to replace the portion of the webpage visible within the viewport by construct rendering data corresponding to the second portion of the webpage corresponding to the first dimension about the position.

* * * * *